United States Patent
Muraoka

(10) Patent No.: US 10,616,749 B2
(45) Date of Patent: Apr. 7, 2020

(54) METHOD AND APPARATUS FOR RADIO COMMUNICATION

(71) Applicant: NEC Corporation, Tokyo (JP)

(72) Inventor: Kazushi Muraoka, Tokyo (JP)

(73) Assignee: NEC Corporation, Tokyo (JP)

( * ) Notice: Subject to any disclaimer, the term of this patent is extended or adjusted under 35 U.S.C. 154(b) by 8 days.

(21) Appl. No.: 15/736,057

(22) PCT Filed: Mar. 31, 2016

(86) PCT No.: PCT/JP2016/001864
§ 371 (c)(1),
(2) Date: Dec. 13, 2017

(87) PCT Pub. No.: WO2017/002285
PCT Pub. Date: Jan. 5, 2017

(65) Prior Publication Data
US 2018/0176759 A1 Jun. 21, 2018

(30) Foreign Application Priority Data
Jun. 29, 2015 (JP) ................................ 2015-130459

(51) Int. Cl.
*H04W 8/00* (2009.01)
*H04L 5/00* (2006.01)
(Continued)

(52) U.S. Cl.
CPC ............ *H04W 8/005* (2013.01); *H04L 5/00* (2013.01); *H04W 72/044* (2013.01); *H04W 92/18* (2013.01)

(58) Field of Classification Search
CPC ..... H04W 8/005; H04W 72/044; H04W 8/00; H04W 92/18; H04L 5/00
See application file for complete search history.

(56) References Cited

U.S. PATENT DOCUMENTS

2017/0195163 A1* 7/2017 Chae ..................... H04W 72/02
2018/0368106 A1* 12/2018 Yoon ................. H04W 28/0289

FOREIGN PATENT DOCUMENTS

WO  WO-2016/021699 A1  2/2016
WO  WO-2016/163474     10/2016

OTHER PUBLICATIONS

International Search Report corresponding to PCT/JP2016/001864 dated Jun. 14, 2016 (one page).

(Continued)

*Primary Examiner* — Moo Jeong
(74) *Attorney, Agent, or Firm* — Wilmer Cutler Pickering Hale and Dorr LLP

(57) ABSTRACT

A radio terminal (1) selects, from a resource pool in a discovery period, $N^{TX}$ subframes for $N^{TX}$ times of transmission of a discovery signal in the discovery period based on a first value n1 of a resource value autonomously selected by the radio terminal (1) or a first value n1 of a parameter received from a base station (2). The $N^{TX}$ subframes selected based on the value n1 are selected so as to share at least one common subframe with $N^{TX}$ subframes selected based on a second value, different from the first value n1, and so as to include at least one subframe different from any of the $N^{TX}$ subframes selected based on the second value. It is thus, for example, possible to attenuate decline in reception quality of a discovery signal due to interference resulting from In-Band Emissions (IBE) when direct discovery of D2D communication is performed.

9 Claims, 10 Drawing Sheets

(51) Int. Cl.
*H04W 72/04* (2009.01)
*H04W 92/18* (2009.01)

(56) References Cited

OTHER PUBLICATIONS

Chiharu Yamazaki et al., "Study on Interference Mitigation using random resource allocation for Device to Device Direct Communication underlaying LTE-Advanced Network", IEICE Technical Report, Jun. 10, 2014, vol. 114, No. 86, (pp. 239-244).
3GPP TS23.303 V12.4.0 Technical Specification Group Services and System Aspects; Proximity-based services (ProSe); Stage 2 (Release 12) (Mar. 2015) (pp. 1-63).
3GPP TS36.213 V12.5.0 Technical Specification Group Radio Access Network; Evolved Universal Terrestrial Radio Access (E-UTRA); Physical layer procedures (Release 12) (Mar. 2015) (pp. 1-239).
Decision to Grant a Patent issued in Japanese Patent Application No. 2017-525789, dated Feb. 18, 2020 (5 pages).

* cited by examiner

| 901 MAPPING INDEX (j) | 902 RESOURCE GROUP INDEX (g) | 903 ABSOLUTE SHIFT FROM FIRST MAPPING | 904 INTRA-RESOURCE GROUP SHIFT (g=0) | 905 SHIFT BETWEEN TWO RESOURCE GROUPS (ALLOCATED g=1 → NEW g=0) | 906 INTRA-RESOURCE GROUP SHIFT (g=1) | 907 SHIFT BETWEEN TWO RESOURCE GROUPS (ALLOCATED g=0 → NEW g=1) |
|---|---|---|---|---|---|---|
| 1 | 0 | 0 | — | | | |
| 1 | 1 | 0 | | — | | 0 |
| 2 | 0 | 1 | 1 | | — | |
| 2 | 1 | 2 | | 1 | 2 | 2, 1 |
| 3 | 0 | 4 | 4, 3 | | 7, 5 | |
| 3 | 1 | 7 | | 4, 2 | | 7, 6, 3 |

Fig. 9

METHOD AND APPARATUS FOR RADIO COMMUNICATION

CROSS-REFERENCE TO RELATED APPLICATIONS

This application is a national stage application of International Application No. PCT/JP2016/001864 entitled "Method and Apparatus for Radio Communication" filed on Mar. 31, 2016, which claims priority to Japanese Patent Application No. 2015-130459 filed on Jun. 29, 2015, the disclosures of which are hereby incorporated by reference in their entirety.

TECHNICAL FIELD

The present disclosure relates to inter-terminal direct communication (i.e., device-to-device (D2D) communication) and, in particular, to transmission of a discovery signal.

BACKGROUND ART

A form of communication in which a radio terminal directly communicates with another radio terminal without communicating through an infrastructure network such as a base station is called device-to-device (D2D) communication. The D2D communication includes at least one of Direct Communication and Direct Discovery. In some implementations, a plurality of radio terminals supporting D2D communication form a D2D communication group autonomously or under the control of a network, and perform communication with another radio terminal in the formed D2D communication group.

Proximity-based services (ProSe) specified in 3GPP Release 12 are examples of the D2D communication (see, for example, Non-patent Literature 1). ProSe direct discovery is performed through a procedure in which a radio terminal capable of performing ProSe (i.e., ProSe-enabled User Equipment (UE)) detects another ProSe-enabled UE by using only the capability of a radio communication technology (e.g., Evolved Universal Terrestrial Radio Access (E-UTRA) technology) possessed by these two UEs. ProSe direct discovery may be performed by three or more ProSe-enabled UEs.

ProSe direct communication enables establishment of a communication path between two or more ProSe-enabled UEs existing in a direct communication range after the ProSe discovery procedure is performed. In other words, ProSe direct communication enables a ProSe-enabled UE to directly communicate with another ProSe-enabled UE, without communicating through a Public Land Mobile Network (PLMN) including a base station (eNodeB). ProSe direct communication may be performed by using a radio communication technology that is also used to access a base station (eNodeB) (i.e., E-UTRA technology) or by using a Wireless Local Area Network (WLAN) radio technology (i.e., IEEE 802.11 radio technology).

In 3GPP Release 12, a radio link between radio terminals used for direct communication or direct discovery is called a Sidelink (see, for example, Section 14 of Non-patent Literature 2). Sidelink transmission uses the Long Term Evolution (LTE) frame structure defined for an uplink and a downlink and uses a subset of uplink resources in frequency and time domains. A radio terminal (i.e., UE) performs sidelink transmission by using Single Carrier FDMA (Frequency Division Multiple Access) (SC-FDMA) similar to that for the uplink.

In 3GPP Release 12 ProSe, allocation of a radio resource for sidelink transmission to a UE is performed by a radio access network (e.g., Evolved Universal Terrestrial Radio Access Network (E-UTRAN)). A UE that has been permitted to perform sidelink transmission by a ProSe function performs ProSe direct discovery or ProSe direct communication by using a radio resource allocated by a radio access network node (e.g., eNodeB (an eNB)).

Regarding ProSe direct discovery, two resource allocation modes, i.e., autonomous resource selection and scheduled resource allocation are specified. The autonomous resource selection and the scheduled resource allocation are referred to as "sidelink discovery Type 1" and "sidelink discovery Type 2", respectively.

In the autonomous resource selection for ProSe direct discovery (i.e., sidelink discovery Type 1), a UE that desires transmission (announcing) of a discovery signal (i.e., Physical Sidelink Shared Channel (PSDCH)) autonomously selects radio resources from a resource pool.

In the scheduled resource allocation for ProSe direct discovery (i.e., sidelink discovery Type 2), a UE requests an eNodeB to allocate resources for announcement via RRC signaling. The eNodeB allocates resources for announcement selected from a resource pool to the UE. When the scheduled resource allocation is used, the eNodeB indicates in a System Information Block (SIB 19) that it provides resources for monitoring of ProSe direct discovery but does not provide resources for announcement.

A resource pool for ProSe direct discovery is referred to as a discovery resource pool and is configured in UEs by an eNB via broadcast (SIB 19) or dedicated signaling (RRC signaling). The discovery resource pool consists of $L_{PSDCH}$ subframes and $M^{PSDCH\_RP}_{RB}$ frequency domain resource blocks in a discovery period. The discovery period is also referred to as a PSDCH period.

A method for designating a discovery resource pool is described with reference to FIG. 1. The discovery resource pool consists of a subframe pool and a resource block pool. To indicate the subframe pool, the eNB specifies the length (P) of a discovery period, the number ($N_R$) of repetitions of a subframe bitmap in the discovery period, and the subframe bitmap and its length ($N_B$).

The length (P) of the discovery period is 32, 64, 128, 256, 512, or 1024 radio frames. In 3GPP Release 12 (LTE-advanced), one radio frame has a length of 10 milliseconds and consists of 10 subframes. The length of one subframe is 1 millisecond. Therefore, the length (P) of the discovery period is 320, 640, 1280, 2560, 5120, or 10240 subframes.

The length ($N_B$) of the subframe bitmap is 4, 8, 12, 16, 30, 40, or 42 bits. The subframe bitmap indicates that subframes corresponding to bits in each of which "0" is set are not used for the discovery and subframes corresponding to bits in each of which "1" is set can be used for the discovery.

The maximum value for the number ($N_R$) of repetitions of the subframe bitmap in a discovery period depends on a duplex mode, i.e., frequency division duplex (FDD) or time division duplex (TDD) and, in TDD, also depends on a UL/DL configuration. Specifically, the maximum value for the number ($N_R$) of repetitions is 5 for FDD and TDD UL/DL configuration 0, 13 for TDD UL/DL configuration 1, 25 for TDD UL/DL configuration 2, 17 for TDD UL/DL configuration 3, 25 for TDD UL/DL configuration 4, 50 for TDD UL/DL configuration 5, or 7 for TDD UL/DL configuration 6.

Therefore, the number ($L_{PSDCH}$) of subframes included in the discovery resource pool corresponding to one discovery period is obtained by multiplying the number of bits in each of which a value "1" is set in the subframe bitmap by the number ($N_R$) of repetitions. In the example shown in FIG. 1, the length ($N_B$) of the subframe bitmap is 8 bits and the number ($N_R$) of repetitions is 5. Further, among the 8 bits in the subframe bitmap, 3 bits are set as usable (i.e., value "1") (hatched subframes in FIG. 1). Therefore, the number ($L_{PSDCH}$) of subframes included in the discovery resource pool is 15.

Meanwhile, to indicate the resource block pool, the eNB specifies an index (S1) of a start Physical Resource Block (PRB), an index (S2) of an end PRB, and the number (M) of PRBs. The resource block pool includes M PRBs whose PRB indexes q are equal to or greater than the start index (S1) and less than S1+M (i.e., S1<=q<S1+M) and M PRBs whose PRB indexes q are greater than S2-M and equal to or less than the end index (S2) (i.e., S2-M<q<=S2) (that is, the resource block pool includes 2M PRBs in total). In other words, the eNB can designate two PRB clusters each of which includes M PRBs as the discovery resource pool.

FIG. 2 shows an example of the discovery resource pool in one discovery period. In the example shown in FIG. 2, the number ($L_{PSDCH}$) of subframes included in the discovery resource pool is 15. The subframes included in the discovery resource pool (i.e., subframe pool) can be expressed as follows:

$$(l_0^{PSDCH}, l_1^{PSDCH}, \ldots, l_{L_{PSDCH}-1}^{PSDCH}).$$

Further, in the example shown in FIG. 2, the number ($M_{RB}^{PSDCH\_RP}$) of resource blocks (PRBs) included in the discovery resource pool is 12. The resource blocks included in the discovery resource pool (i.e., the resource block pool) can be expressed as follows:

$$(m_0^{PSDCH}, m_1^{PSDCH}, \ldots, m_{M_{RB}^{PSDCH\_RP}-1}^{PSDCH}).$$

In this specification, several figures similar to FIG. 2 are used to shows a discovery resource pool in one discovery period. However, in view of the above, it should be noted that a plurality of subframes included in one discovery resource pool may not be temporally contiguous. Further, resource blocks included in one discovery resource pool include two clusters.

Next, radio resource allocation for transmission of a discovery signal (i.e., PSDCH) specified in 3GPP Release 12 will be described. Details of the radio resource allocation are described in detail in Section 14.3 of Non-patent Literature 2. As already described, two different methods, i.e., sidelink discovery Type 1 and Type 2 are specified for radio resource allocation for transmission of a discovery signal (PSDCH). In the Sidelink discovery Type 1, radio resources are allocated on a non-UE specific basis. In contrast to this, in the Sidelink discovery Type 2, radio resources are allocated on a UE specific basis. Note that regarding the Type 2, though two types, i.e., Type 2A and Type 2B had been discussed, only Type 2B is specified in the current Release 12. In Type 2B, an eNB allocates radio resources for transmission of a discovery signal (PSDCH) to a UE in a semi-persistent manner. In contrast to this, in Type 2A, which is not specified in the current Release 12, an eNB allocates radio resources for transmission of a discovery signal (PSDCH) dynamically to a UE in each discovery period (i.e., PSDCH period).

The following provides a description about allocation of resources in the Sidelink discovery Type 1. In the Sidelink discovery Type 1, a UE autonomously selects a resource value $n_{PSDCH}$ and determines subframes and resource blocks for PSDCH transmission as follows.

The number of transmissions of a transport block on PSDCH in an i-th PSDCH period is $N_{SLD}^{TX}=n+1$ where n is given by the higher layer parameter "discoveryNumRetx". The parameter discoveryNumRetx is configured in the UE by the eNB by using, for example, dedicated signaling (e.g., RRC Connection Reconfiguration).

The allowed resource values $n_{PSDCH}$ from which the UE can select are integers from 0 to ($N_t*N_f-1$), where $N_t$ and $N_f$ are defined as follows:

$$N_t = \lfloor L_{PSDCH}/N_{SLD}^{TX} \rfloor,$$

$$N_f = \lfloor M_{RB}^{PSDCH\_RP}/2 \rfloor.$$

The j-th transmission for a discovery signal (i.e., the transport block on the PSDCH) in the discovery period occurs in the subframe $$l_{N_{SLD}^{TX} \cdot b_1 + j - 1}^{PSDCH}$$

among $L_{PSDCH}$ subframes (i.e., $l_0^{PSDCH}, l_1^{PSDCH}, \ldots, l_{L\_PSDCH-1}^{PSDCH}$) in the discovery resource pool and uses two contiguous resource blocks $$m_{2 \cdot a_j}^{PSDCH} \text{ and } m_{2 \cdot a_j}^{PSDCH}$$

of the above-shown subframe, where $$a_j = ((j-1) \cdot \lfloor N_f/N_{SLD}^{TX} \rfloor + \lfloor n_{PSDCH}/N_t \rfloor) \bmod N_f,$$

$$b_1 = n_{PSDCH} \bmod N_t.$$

FIG. 3 shows an example of radio resource allocation based on the Sidelink discovery Type 1 when $L^{PSDCH}=15$, $M_{RB}^{PSDCH\_RP}=12$, and $N_{SLD}^{TX}=3$. A numerical value in each cell shown in FIG. 3 indicates a value of the resource value $n_{PSDCH}$ that a UE can select. For example, when $n_{PSDCH}=0$, PSDCH transmission is performed three times in the first, second, and third subframes $l_0^{PSDCH}$, $l_1^{PSDCH}$, and $l_2^{PSDCH}$ in the discovery resource pool. Similarly to this, when $n_{PSDCH}=5$, PSDCH transmission is also performed three times in the first, second, and third subframes $l_0^{PSDCH}$, $l_1^{PSDCH}$, and $l_2^{PSDCH}$ in the discovery resource pool.

CITATION LIST

Non Patent Literature

Non-patent Literature 1: 3GPP TS 23.303 V 12.4.0 (2015-03), "3rd Generation Partnership Project; Technical Specification Group Services and System Aspects; Proximity-based services (ProSe); Stage 2 (Release 12)", March 2015

Non-patent Literature 2: 3GPP TS 36.213 V12.5.0 (2015-03), "3rd Generation Partnership Project; Technical Specification Group Radio Access Network; Evolved Universal Terrestrial Radio Access (E-UTRA); Physical layer procedures (Release 12)", March 2015

SUMMARY OF INVENTION

Technical Problem

As understood from FIG. 3, in the Sidelink discovery Type 1 specified in 3GPP Release 12, regarding some of $N_t*N_f$ resource values $n_{PSDCH}$ ($0<=n_{PSDCH}<=N_t*N_f-1$) that a UE can arbitrarily select, $N_{SLD}^{TX}$ times of PSDCH transmission in the discovery period are performed in the completely same set of subframes. For example, in the example shown in FIG. 3, when the resource values $n_{PSDCH}$ are 0, 5, 10, 15, 20, and 25, PSDCH transmissions are performed three times in the subframes $l_0^{PSDCH}$, $l_1^{PSDCH}$, and $l_2^{PSDCH}$.

This radio resource allocation may cause interference in a frequency domain due to In-Band Emissions (IBE) as described below.

In general, it has been known that transmission performed by a UE causes interference in a frequency domain to unallocated resource blocks (subcarriers) due to In-Band Emissions (IBE). Therefore, interference resulting from IBE may occur when a plurality of D2D transmissions are simultaneously performed in close proximity to each other. Further, according to radio resource allocation in the Sidelink discovery Type 1 specified in 3GPP Release 12, for example, a UE that has selected a resource value $n_{PSDCH}=0$ and another UE that has selected a resource value $n_{PSDCH}=5$ transmit their discovery signals (PSDCH) in completely the same subframes, and thus In-band interference due to IBE may become more serious. For example, as shown in FIG. 4, assume a case in which when a monitoring UE 401 is attempting to monitor a discovery signal (i.e., a desired signal) transmitted from an announcing UE 402, another announcing UE 403 transmits a discovery signal (i.e., a non-desired signal) near the monitoring UE 401. If the value $n_{PSDCH}$ selected by the announcing UE 402 is "0" and the value $n_{PSDCH}$ selected by the announcing UE 403 is "5", these two announcing UEs 402 and 403 transmit discovery signals in completely the same set of subframes. Therefore, reception quality in the monitoring UE 401 of the discovery signal (the desired signal) from the announcing UE 402 may decrease due to In-band interference.

Note that the above-described problem is not limited to the Sidelink discovery Type 1 but may also occur in radio resource allocation in accordance with the Sidelink discovery Type 2B. In the Sidelink discovery Type 2B, a subframe and resource blocks in which the first transmission in the discovery period occurs are determined based on three parameters $N_{PSDCH}^{(1)}$, $N_{PSDCH}^{(2)}$, and $N_{PSDCH}^{(3)}$ given to an UE by the eNB using the PSDCH resource configuration. However, UEs that use different resource block pairs of the same subframes in the first PSDCH transmission also use the same subframes for the subsequent second to $N_{SLD}^{TX}$-th transmissions. Therefore, the above-described interference caused by IBE may also be serious in the Sidelink discovery Type 2B specified in 3GPP Release 12.

One of the objects to be attained by embodiments disclosed in this specification is to provide an apparatus, a method, and a program that contribute to attenuating decline in reception quality of a discovery signal due to interference resulting from IBE when direct discovery of D2D communication is performed.

Solution to Problem

In a first aspect, a method for radio communication performed in a radio terminal includes selecting, from a resource pool including L subframes and M frequency domain resource blocks in a discovery period, a set of $N^{TX}$ subframes for $N^{TX}$ times of transmission of a discovery signal in the discovery period based on a first value n1 of a resource value autonomously selected by the radio terminal or a first value n1 of a parameter received from a base station. The set of $N^{TX}$ subframes selected based on the first value n1 are selected so as to share at least one common subframe with another set of $N^{TX}$ subframes selected based on a second value of the resource value or the parameter, different from the first value n1, and so as to include at least one subframe different from any of the other set of $N^{TX}$ subframes selected based on the second value.

In a second aspect, a radio terminal includes at least one radio transceiver and at least one processor. The at least one processor is configured to perform cellular communication with a cellular network and device-to-device communication with another radio terminal by using the at least one radio transceiver. The at least one processor is further configured to select, from a resource pool including L subframes and M frequency domain resource blocks in a discovery period, a set of $N^{TX}$ subframes for $N^{TX}$ times of transmission of a discovery signal in the discovery period based on a first value n1 of a resource value autonomously selected by the radio terminal or a first value n1 of a parameter received from a base station. The set of $N^{TX}$ subframes selected based on the first value n1 are selected so as to share at least one common subframe with another set of $N^{TX}$ subframes selected based on a second value of the resource value or the parameter, different from the first value n1, and so as to include at least one subframe different from any of the other set of $N^{TX}$ subframes selected based on the second value.

In a third aspect, a program includes a set of instructions (software codes) that, when loaded into a computer, causes the computer to perform a method according to the above-described first aspect.

Advantageous Effects of Invention

According to the above-described aspects, it is possible to provide an apparatus, a method, and a program that contribute to attenuating decline in reception quality of a discovery signal due to interference resulting from IBE when direct discovery of D2D communication is performed.

BRIEF DESCRIPTION OF DRAWINGS

FIG. 3 shows an example of a selection of subframes and resource blocks for discovery signal (PSDCH) transmission in accordance with 3GPP Release 12;

FIG. 7 shows an example of a selection of subframes and resource blocks for discovery signal (PSDCH) transmission performed by a radio terminal according to the first embodiment;

FIG. 8 shows an example of a selection of subframes and resource blocks for discovery signal (PSDCH) transmission performed by a radio terminal according to a second embodiment;

FIG. 9 is a table for explaining a selection of subframes and resource blocks for discovery signal (PSDCH) transmission according to the second embodiment.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

The following embodiments will be described on the assumption that they are implemented to improve ProSe specified in 3GPP Release 12 (LTE-Advanced). However, these embodiments are not limited to the LTE-Advanced and its improvements and may also be applied to D2D communication in other mobile communication networks or systems.

First Embodiment

Figure 1:
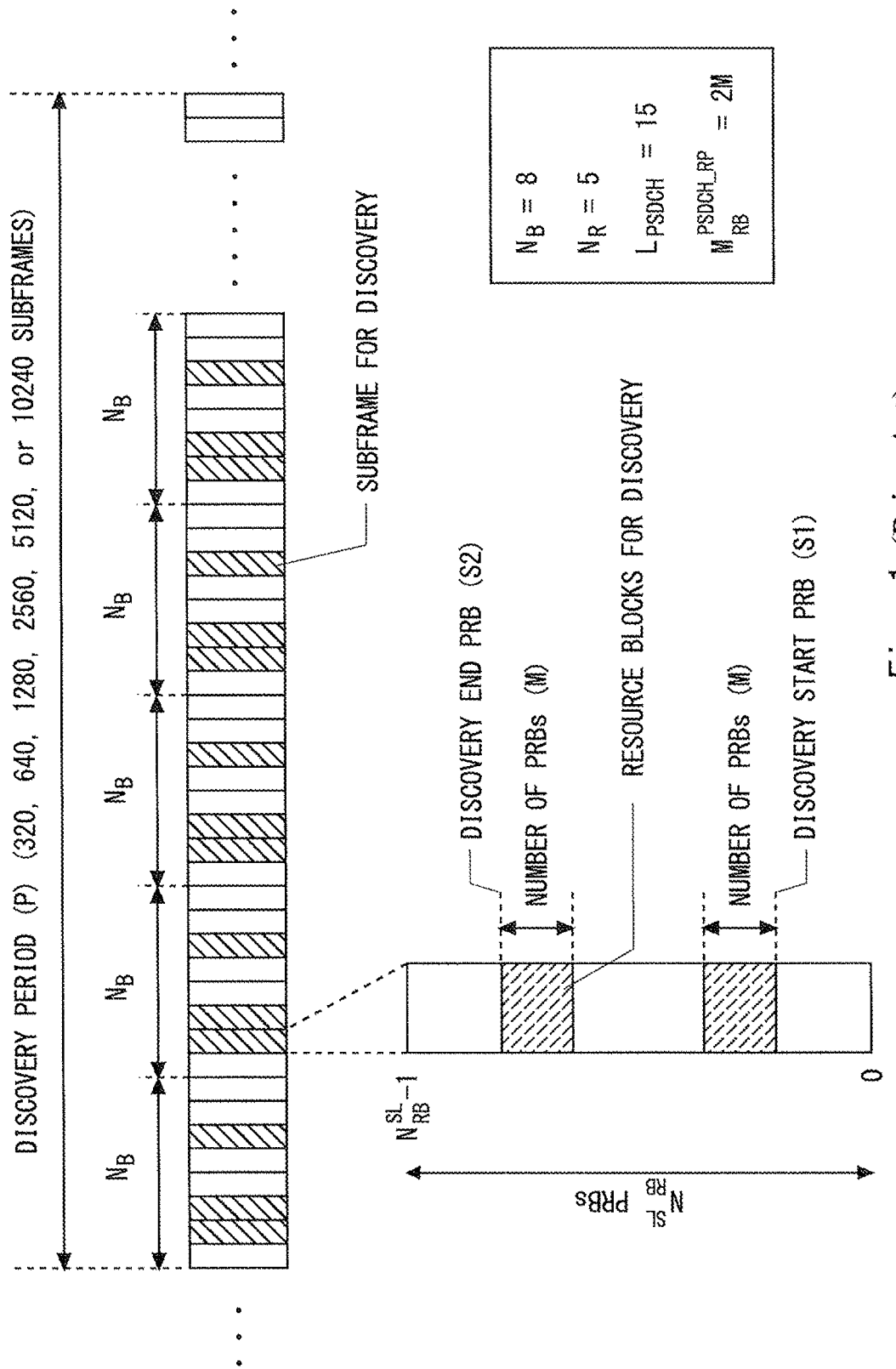
FIG. 1 shows an example of a relation between discovery periods (PSDCH periods) and time-frequency resources used for transmission of discovery signals (PSDCH)
Figure 2:
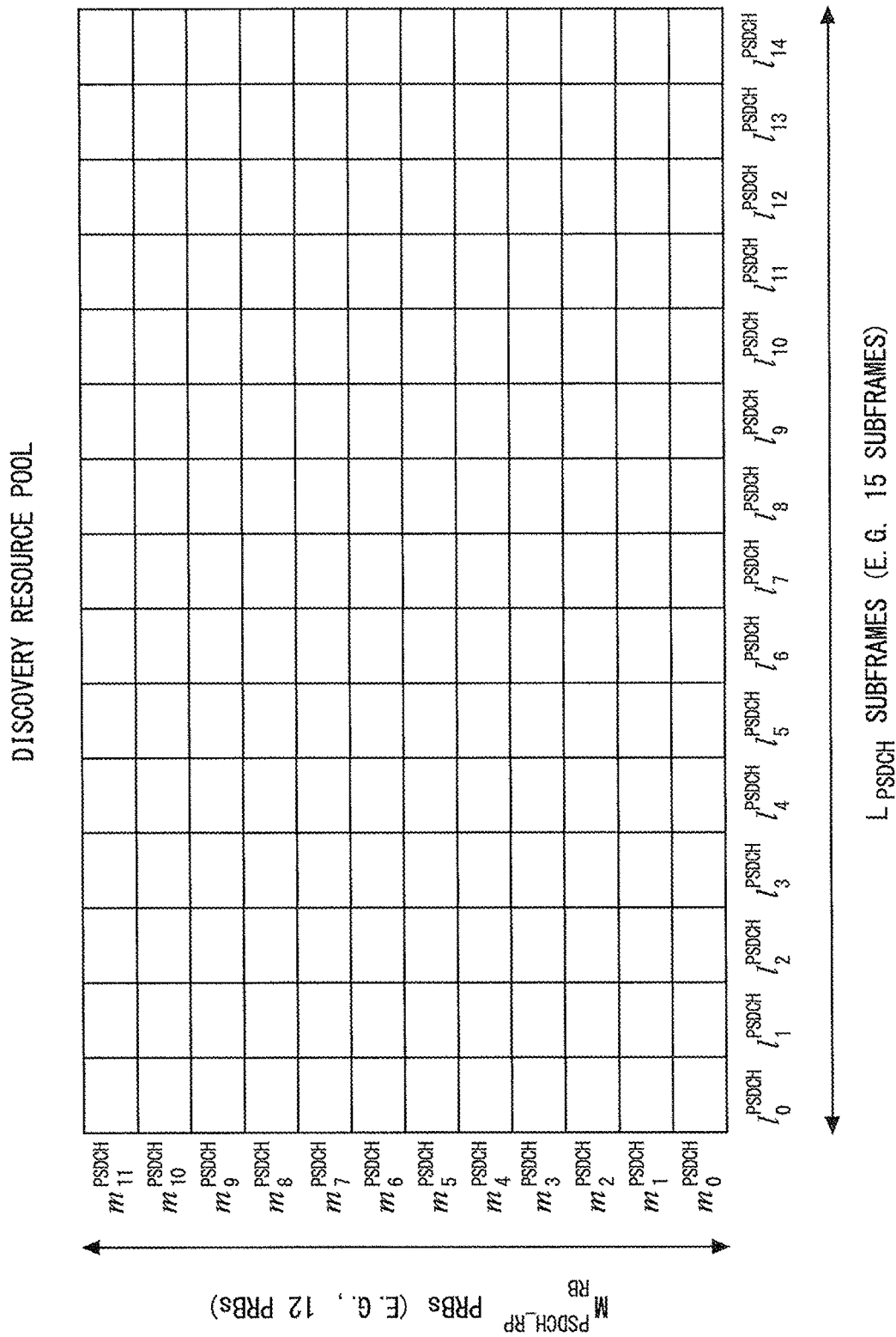
FIG. 2 shows an example of a discovery resource pool.
Figure 4:
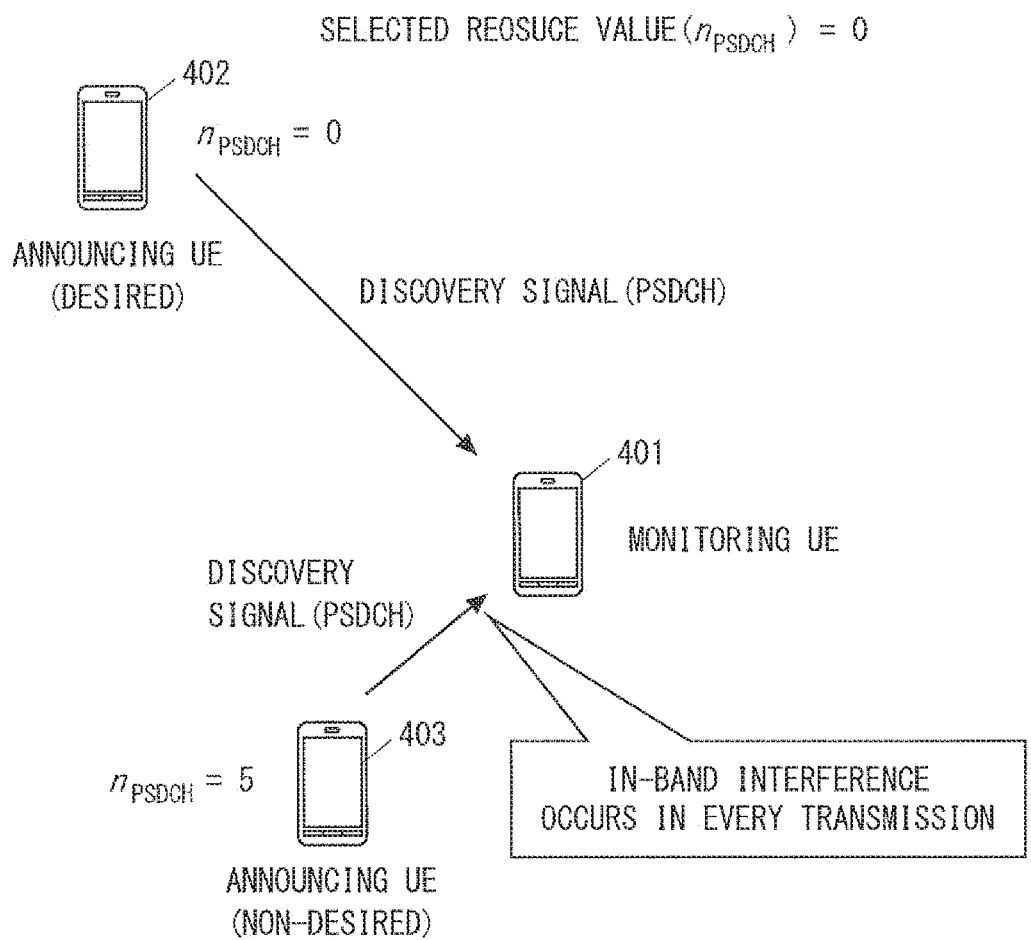
FIG. 4 shows an example of interference resulting from In-Band Emissions (IBE)
Figure 5:
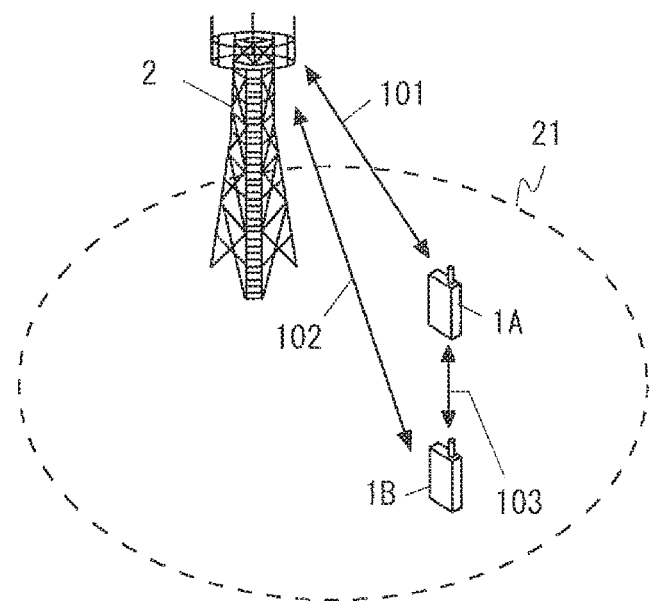
FIG. 5 shows a configuration example of a radio communication system according to some embodiments.

FIG. 5 shows a configuration example of a radio communication system according to some embodiments including this embodiment. Each of UEs 1A and 1B includes at least one radio transceiver and is configured to perform cellular communication (101 or 102) with a base station 2 and D2D communication on an inter-terminal direct interface (e.g., a PC5 interface of a sidelink) 103. This D2D communication includes at least direct discovery (e.g., ProSe Direct Discovery) and may further include direct communication (ProSe Direct Communication). The eNB 2 manages a cell 21 and is able to perform cellular communication (101 and 102) with each of the plurality of UEs 1 by using a cellular communication technology (e.g., an Evolved Universal Terrestrial Radio Access (E-UTRA) technology). Although the example of FIG. 5 indicates an arrangement where the UEs 1A and 1B are located in the same cell 21 for simplifying the description, this arrangement is merely an example. For example, the UE 1A may be located in one of two cells that are adjacent to each other and are managed by different eNBs 2, and the UE 1B may be located in the other one of the two cells. Alternatively, at least one of the UEs 1A and 1B may be located outside the coverage of one or more eNBs 2.

The UE 1 is configured to select $N^{TX}_{SLD}$ subframes for $N^{TX}_{SLD}$ times of transmission of a discovery signal in a discovery period (a PSDCH period) from a resource pool consisting of $L_{PSDCH}$ subframes and $M^{PSDCH\_RP}_{RB}$ frequency domain resource blocks in the discovery period. In the case of the sidelink discovery Type 1 (i.e., the autonomous resource selection), the UE 1 may select $N^{TX}_{SLD}$ subframes based on a resource value $n_{PSDCH}$ that is autonomously selected by the UE 1. In contrast to this, in the case of the sidelink discovery Type 2B (i.e., the scheduled resource allocation), the UE 1 may receive a PSDCH resource configuration including one or more parameters (e.g., $N_{PSDCH}^{(1)}$, $N_{PSDCH}^{(2)}$, and $N_{PSDCH}^{(3)}$) from the eNB 2 and select $N^{TX}_{SLD}$ subframes based on at least one of the received one or more parameters.

Figure 6:
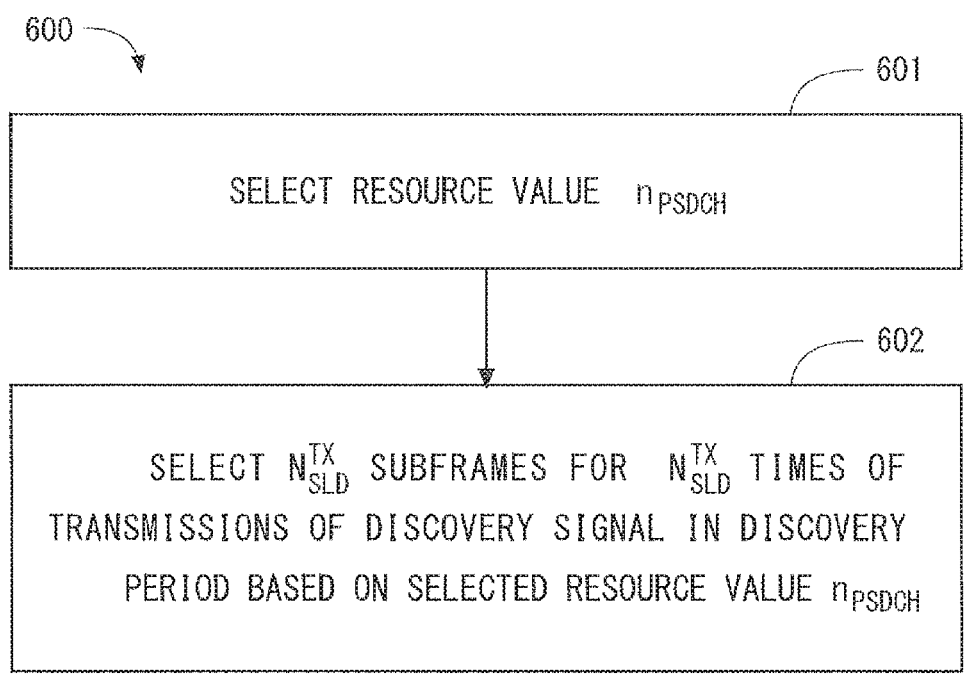
FIG. 6 is a flowchart showing an example of an operation performed by a radio terminal according to a first embodiment.

FIG. 6 shows a flowchart showing an example (a process 600) performed by the UE 1 when it selects a radio resource for direct discovery. Note that FIG. 6 shows a case of the sidelink discovery Type 1 (the autonomous resource selection). In block 601, the UE 1 autonomously selects a resource value $n_{PSDCH}$. In block 602, the UE 1 selects $N_{SLD}^{TX}$ subframes for $N_{SLD}^{TX}$ times of transmission of the discovery signal (i.e., PSDCH) in the discovery period (i.e., PSDCH period) based on the selected resource value $n_{PSDCH}$.

A rule or algorithm used by the UE 1 to select subframes in the block 602 is defined so that a first set of $N^{TX}_{SLD}$ subframes selected when the resource value $n_{PSDCH}$ has a first value shares at least one common subframe with a second set of $N^{TX}_{SLD}$ subframes selected when the resource value $n_{PSDCH}$ has a second value different from the first value, and so that the first set of $N^{TX}_{SLD}$ subframes has at least one subframe different from any of the second set of $N^{TX}_{SLD}$ subframes.

To put it differently, in the subframe selection in the block 602, a set of $N^{TX}_{SLD}$ subframes selected when the resource value $n_{PSDCH}$ has the first value shares at least one common subframe with another set of $N^{TX}_{SLD}$ subframes selected when the resource value $n_{PSDCH}$ has the second value different from the first value, but includes at least subframe different from any of the $N^{TX}_{SLD}$ subframes selected when the resource value $n_{PSDCH}$ has the second value.

To put it differently, upon following the subframe selection in the block 602, when the resource value $n_{PSDCH}$ has the first value, the UE 1 uses in a transmission opportunity (e.g., j-th transmission) in the discovery period (i.e., PSDCH period) the same subframe as when the resource value $n_{PSDCH}$ has the second value, but it uses in another transmission opportunity (e.g., (j+1)th transmission) a subframe different from that used when the resource value $n_{PSDCH}$ has the second value.

In this way, it is possible to avoid a situation in which $N^{TX}_{SLD}$ times of transmission of the discovery signal (i.e., PSDCH) in the discovery period (i.e., PSDCH period) performed by one UE 1 that has selected one resource value $n_{PSDCH}$ (e.g., the first value) occurs completely in the same set of subframes as $N^{TX}_{SLD}$ times of transmission of the discovery signal (PSDCH) performed by another UE 1 that has selected another resource value $n_{PSDCH}$ (e.g., the second value). Therefore, it is ensured that even when these two UEs 1 transmit their discovery signals in the same subframe in one transmission opportunity, they transmit their discovery signals in different subframes in another transmission opportunity. Therefore, even when these two UEs 1 are close to each other, it is possible to prevent a situation in which interference caused by IBE from one of the UEs 1 occurs in every one of $N^{TX}_{SLD}$ times of transmission of the discovery signal (PSDCH) performed by the other UE 1.

Figure 3:
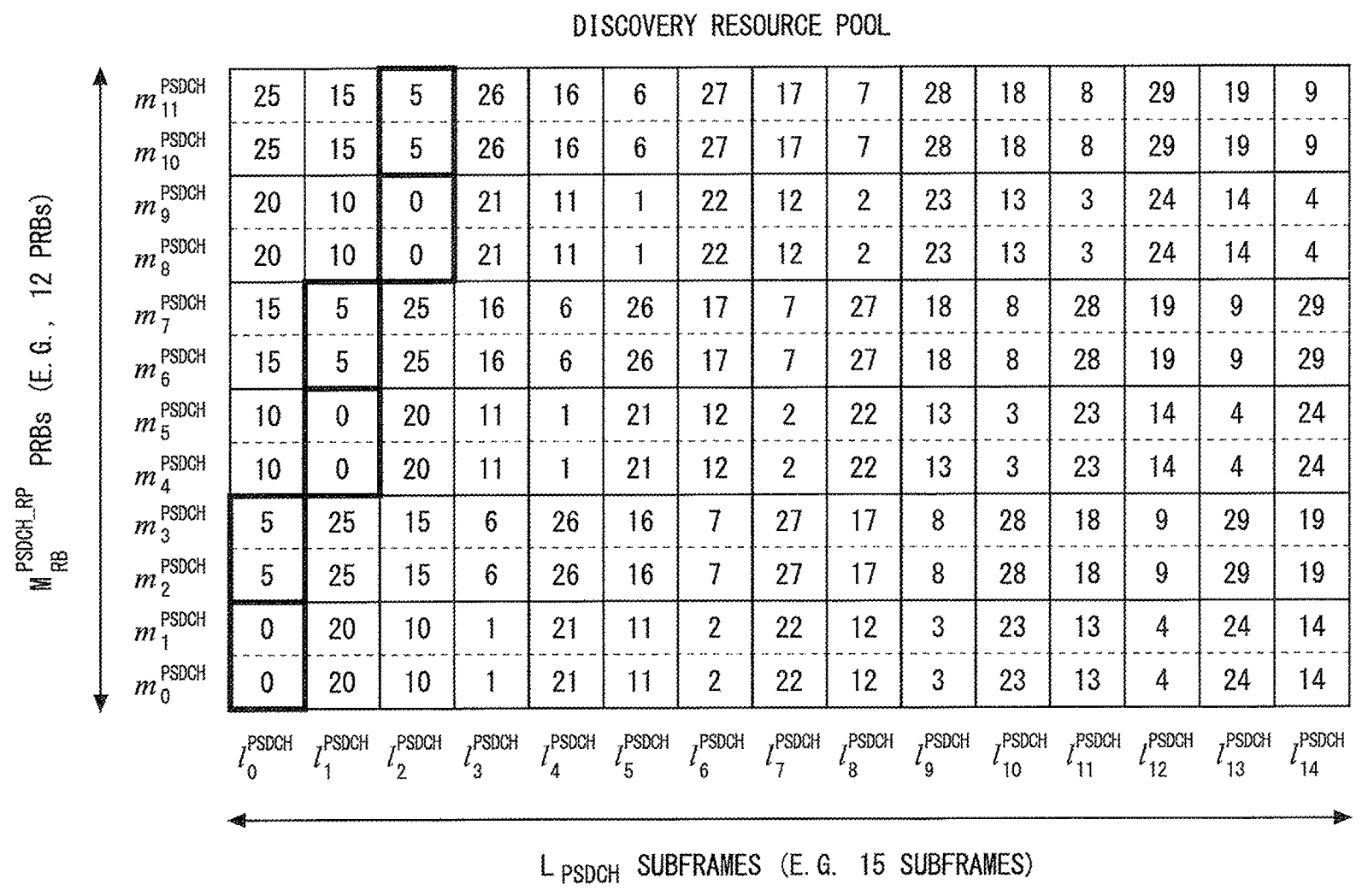
Figure 7:
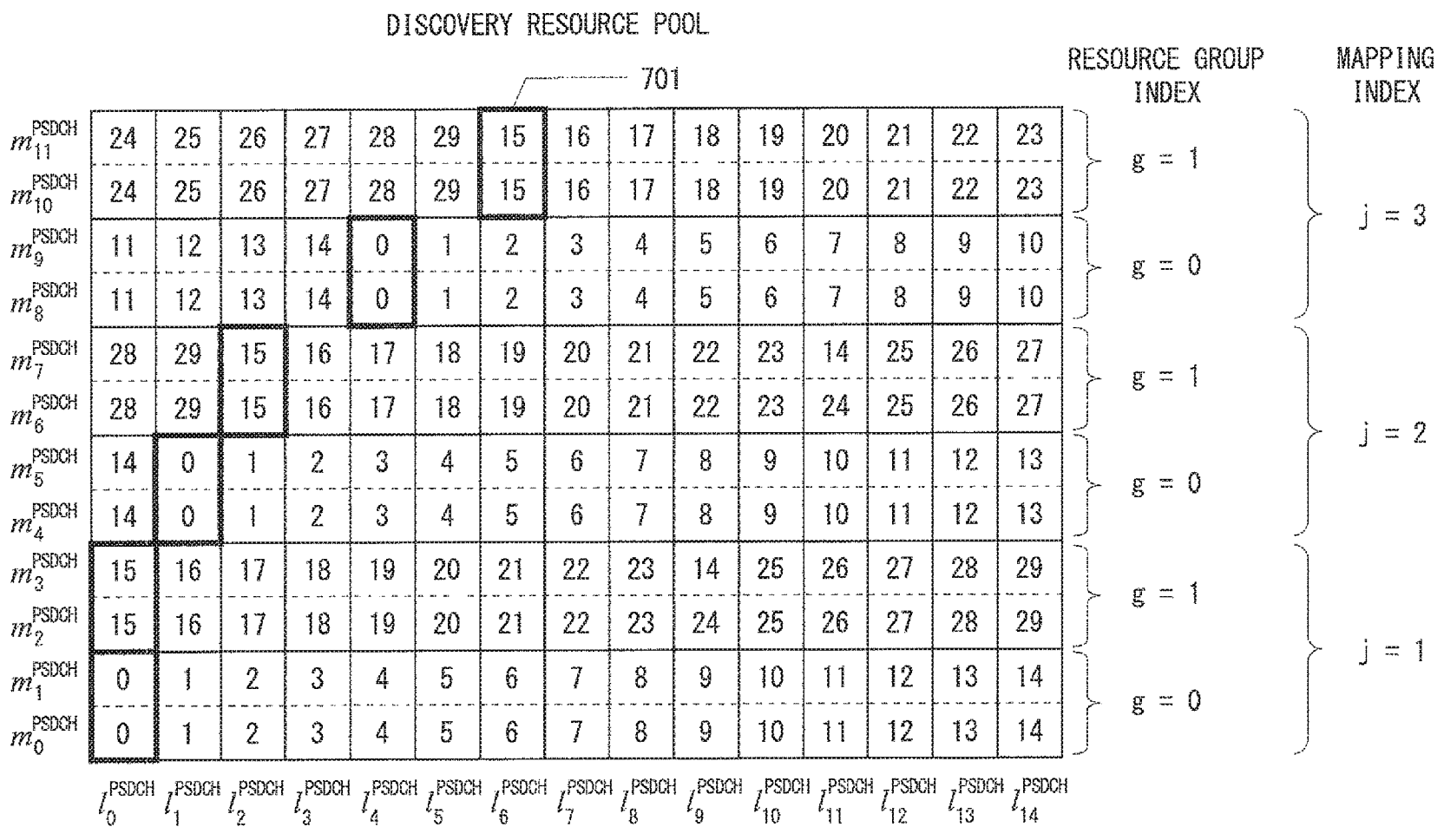

The following provides some specific examples of a radio resource selection for direct discovery according to this embodiment. In some implementations, the subframe selecting rule or algorithm in the block 602 may be defined so that a time shift amount (or a time shift value) from the subframe used for (j−1)th transmission (1<j) to the subframe used for j-th transmission of the discovery signal in the discovery period changes depending, for example, on whether the resource value $n_{PSDCH}$ has the first value or the second value as shown in FIG. 7. Similarly to FIG. 3, FIG. 7 shows an example of radio resource allocation based on the Sidelink discovery Type 1 in which: the number ($L_{PSDCH}$) of subframes included in the discovery resource pool is 15 ($L_{PSDCH}$=15); the number ($M_{RB}^{PSPDCH\_RP}$) of resource blocks (RPBs) is 12 ($M_{RB}^{PSPDCH\_RP}$=12); and the number ($N_{SLD}^{TX}$) of PSDCH transmissions in one discovery period is 3 ($N_{SLD}^{TX}$=3). A numerical value in each cell shown in FIG. 7 indicates a value of the resource value $n_{PSDCH}$ that the UE 1 can select.

In the PSDCH resource selection in 3GPP Release 12 described in the background art section, a time shift amount from the subframe used for (j−1)th transmission (1<j) to the subframe used for j-th transmission is constant irrespective of which value the resource value $n_{PSDCH}$ has. For example, as understood from FIG. 3, a time shift amount from the subframe used for (j−1)th transmission (1<j) to the subframe used for j-th transmission is constant irrespective of whether the resource value $n_{PSDCH}$ has a value "0" or a value "5".

In contrast to this, in mapping between resource values $n_{PSDCH}$ and radio resources shown in FIG. 7, a PSDCH is transmitted in the same subframe, i.e., the first subframe ($1_0^{PSDCH}$) in the first transmission both when the resource value $n_{PSDCH}$ is "0" and when the resource value $n_{PSDCH}$ is "15". However, the second transmission occurs in the second subframe ($1_1^{PSDCH}$) when the resource value $n_{PSDCH}$ is "0", whereas the second transmission occurs in the third subframe ($1_2^{PSDCH}$) when the resource value $n_{PSDCH}$ is "15". That is, in the example shown in FIG. 7, a time shift amount from the subframe ($1_0^{PSDCH}$) used for the first transmission to the subframe used for the second transmission changes depending on whether the resource value $n_{PSDCH}$ is "0" or "15".

An example of a radio resource selection or allocation for obtaining the mapping shown in FIG. 7 will be described hereinafter.

Similarly to 3GPP Release 12, the allowed resource values $n_{PSDCH}$ from which the UE 1 can select are integers from 0 to ($N_t * N_f - 1$), where $N_t$ and $N_f$ are defined as follows:

$$N_t = \lfloor L_{PSDCH} / N_{SLD}^{TX} \rfloor,$$

$$N_f = \lfloor M_{RB}^{PSDCH\_RP} / 2 \rfloor.$$

Further, in this embodiment, the resource group index g is defined based on the resource value $n_{PSDCH}$ by the following expression:

$$g = \lfloor n_{PSDCH} / L_{PSDCH} \rfloor.$$

The total number ($N_{GROUP}$) of the resource groups separated by the resource group index g is expressed as the following expression:\

$$N_{GROUP} = \lfloor N_t \cdot N_f / L_{PSDCH} \rfloor.$$

By carefully analyzing the mapping between resource values $n_{PSDCH}$ and radio resources shown in FIG. 7, the following matters can be understood. When the selected resource value $n_{PSDCH} = 0$, the resource group index g=0 and, accordingly, the first, second, and third transmissions occur in the subframes $1_0^{PSDCH}$, $1_1^{PSDCH}$, and $1_4^{PSDCH}$, respectively. In contrast, when the selected resource value $n_{PSDCH} = 15$, the resource group index g=1 and, accordingly, the first, second, and third transmissions occur in the subframes $1_0^{PSDCH}$, $1_2^{PSDCH}$, and $1_6^{PSDCH}$, respectively.

That is, when j is equal to or greater than 2, a shift amount $\Delta_{Txj-Tx(j-1)}$ from the (j−1)th transmission subframe (1<j) to the j-th transmission subframe corresponds to the (j−1)th term in an arithmetic progression whose first term is g+1 and whose common difference is the number of groups ($N_{GROUP}$) and is expressed by the following expression:

$$\Delta_{Txj-Tx(j-1)} = (g+2) + (j-2) N_{GROUP} \text{ for } 1 < j \leq N_{SLD}^{TX}.$$

Therefore, when the number j is equal to or greater than 2, for the subframe selection in the j-th transmission (the j-th mapping), a total sift amount $\Delta_{Txj-Tx1}$ from the transmission subframe in the first transmission (the first mapping) corresponds to the sum of the first to the (j−1)th terms of the arithmetic progression whose first term is g+1 and whose common difference is the number of groups ($N_{GROUP}$) and is expressed by the following expression:

$$\Delta_{Txj-Tx1} = \frac{j-1}{2} \{2(g+1) + (j-2) N_{GROUP}\} \text{ for } 1 < j \leq N_{SLD}^{TX}.$$

In the case of the sidelink discovery Type 1 (i.e., the autonomous resource selection), the UE 1 may autonomously select the resource value $n_{PSDCH}$ and determine subframes and resource blocks for the PSDCH transmission as follows. The number of transmissions of a transport block on the PSDCH in the i-th PSDCH period is expressed as "$N_{SLD}^{TX} = n+1$", where n is given by discoveryNumRetx which is a higher layer parameter. The parameter discoveryNumRetx is set in the UE 1 by the eNB 2 by using, for example, dedicated signaling (e.g., RRC Connection Reconfiguration).

If the UE 1 is configured to transmit a PSDCH in the i-th PSDCH period, the UE 1 may perform the PSDCH transmission as follows. That is, the j-th transmission (where j is no less than 1 and no greater than $N_{SLD}^{TX}$) of a transport block on the PSDCH occurs in the subframe $$l_{b_j}^{PSDCH}$$

among $L_{PSDCH}$ subframes (i.e., $l_0, l_1, \ldots, l_{L\_PSDCH-1}$) in the discovery resource pool and uses the two contiguous resource blocks $$m_{2 \cdot a_j}^{PSDCH} \text{ and } m_{2 \cdot a_j+1}^{PSDCH}$$

of this subframe, where $$b_1 = n_{PSDCH} \bmod L_{PSDCH} \text{ for } j = 1,$$

$$b_j = \left[ b_1 + \frac{j-1}{2} \{2(g+1) + (j-2) N_{GROUP}\} \right] \bmod L_{PSDCH} \text{ for }$$

$$1 < j \leq N_{SLD}^{TX},$$

$$a_j = (j-1) N_{GROUP} + g,$$

Note that to make the mapping between resource values $n_{PSDCH}$ and radio resources shown in FIG. 7 easier, the number ($L_{PSDCH}$) of subframes included in the discovery resource pool, the number ($M_{RB}^{PSDCH\_RP}$) of resource blocks included in the discovery resource pool, and the number ($N_{SLD}^{TX}$) of transmissions of the discovery signal (PSDCH) in the discovery period may be restricted so that the number ($N_t * N_f$) of values that the resource value $n_{PSDCH}$ can possibly have becomes an integral multiple of the number ($L_{PSDCH}$) of subframes included in the discovery resource pool.

Second Embodiment

This embodiment provides a modified example of radio resource selection (allocation) for direct discovery described in the first embodiment. A configuration example of a radio communication system according to the embodiment is similar to that shown in FIG. 5 and an operation of the UE 1 to select radio resources is similar to that shown in FIG. 6.

In the mapping shown in FIG. 7, twice or more times of PSDCH transmission are performed in the same set of subframes with regard to some combinations of resource values $n_{PSDCH}$. For example, assuming a case where $n_{PSDCH} = 0$ and $n_{PSDCH} = 28$, PSDCH transmissions simultaneously occur in the subframe $1_0^{PSDCH}$ and also in the subframe $1_4^{PSDCH}$.

Figure 8:
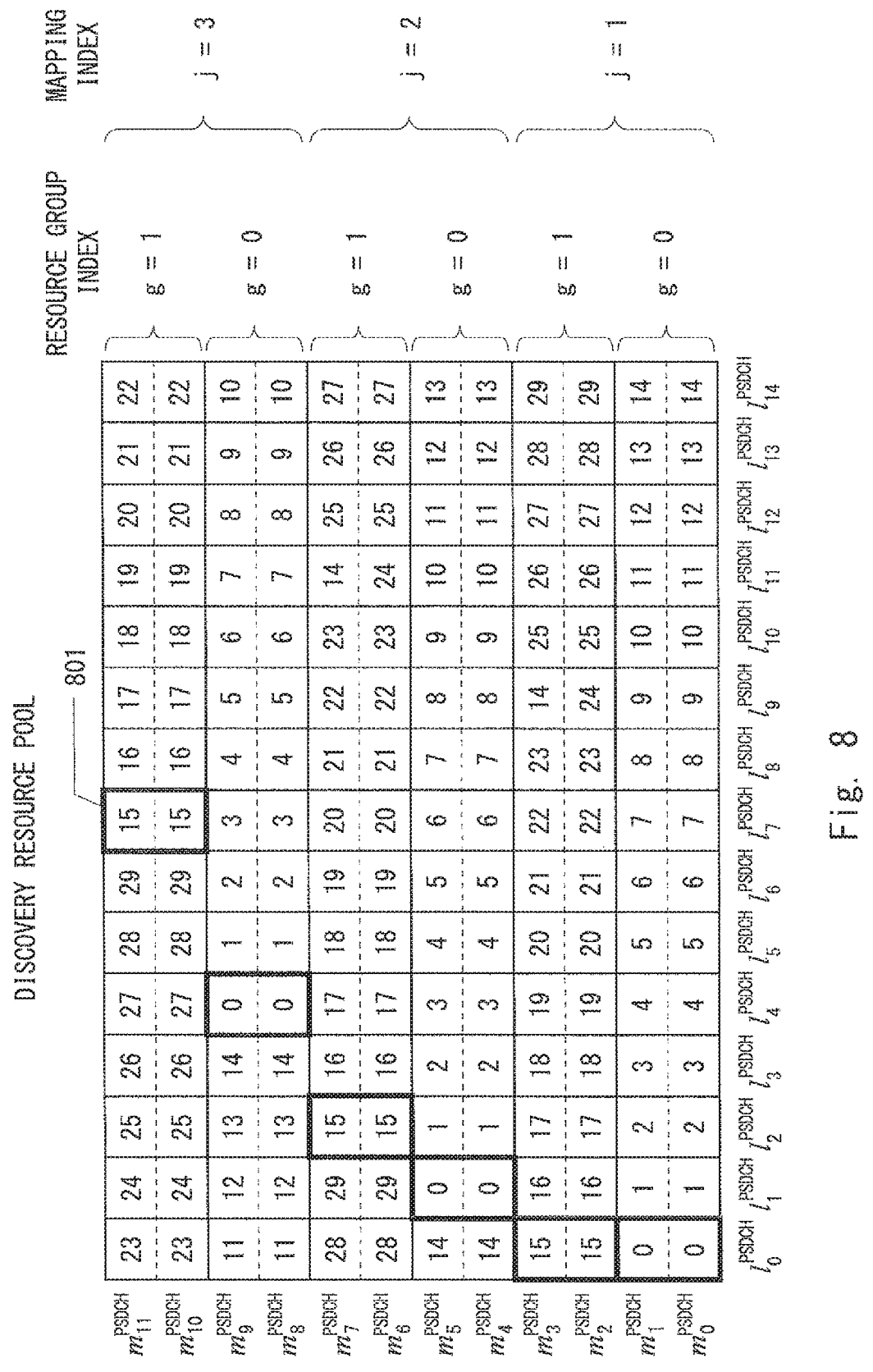

To avoid a situation in which twice or more times of PSDCH transmission are performed in the same set of subframes with regard to a combination of any two resource values $n_{PSDCH}$ as much as possible, the mapping between resource values $n_{PSDCH}$ and radio resources may be defined, for example, as shown in FIG. 8. Comparing FIG. 8 with FIG. 7, the resource value $n_{PSDCH} = 15$ is mapped to the subframe $1_6^{PSDCH}$ when the mapping index j=3 and the resource group index g=1 (701). In contrast to this, in FIG.

8, the resource value $n_{PSDCH}=15$ is mapped to the subframe $1_7^{PSDCH}$ when the mapping index j=3 and the resource group index g=1 (801). In this way, it is possible to avoid the simultaneous PSDCH transmissions of $n_{PSDCH}=0$ and $n_{PSDCH}=28$ in the subframe $1_4^{PSDCH}$, which occur in the mapping shown in FIG. 7.

The mapping shown in FIG. 8 may be obtained by determining time shift amounts so that, when mapping transmissions to $L_{PSDCH}$ subframes in the resource pool one by one in ascending order of the mapping index j from j=1 and in ascending order of the resource group index g from g=0, a time shift amount between resource groups does not coincide with already-used time shift amounts. More specifically, while paying attention to a representative resource value in each resource group (e.g., $n_{PSDCH}=0$ in g=0, and $n_{PSDCH}=15$ in g=1 in FIG. 8), when transmission of a resource group (e.g., g=1) is time-shifted and newly assigned (i.e., mapped) to subframes, time shift amounts may be determined so that a time shift amount from each transmission subframe of a representative resource value of (e.g., $n_{PSDCH}=0$ in g=0) of another already-assigned (already-mapped) resource group (e.g., g=0) to a transmission subframe of a representative resource value (e.g., $n_{PSDCH}=15$ in g=1) of newly-assigned resource group (e.g., g=1) does not coincide with an already-used time shift amount.

A specific example is described with reference to FIGS. 8 and 9. FIG. 9 is a table for showing time shift amounts that are used in the mapping shown in FIG. 8. To understand the table shown in FIG. 9, it is advisable to refer to $n_{PSDCH}=0$ shown in FIG. 8 as the representative resource value of the resource group g=0 and refer to $n_{PSDCH}=15$ shown in FIG. 8 as the representative resource value of the resource group g=1.

In FIG. 9, the column 901 shows mapping index j and the column 902 shows resource group index g. In the example shown in FIG. 9, the value of the mapping index j is from 1 to 3 and the value of the resource group index g is from 0 to 1.

The column 903 shows an absolute time shift amount from the subframe that is selected in the first mapping. Regarding the first row in the column 903, since it is the first mapping for the group g=0, the absolute time shift amount from the subframe ($1_0^{PSDCH}$) that is selected in the first mapping for the representative resource value $n_{PSDCH}=0$ of the group g=0 is zero as a matter of course. Similarly, regarding the second row in the column 903, since it is the first mapping for the group g=1, the absolute time shift amount from the subframe ($1_0^{PSDCH}$) that is selected in the first mapping for the representative resource value $n_{PSDCH}=15$ of the group g=1 is zero as a matter of course. Next, regarding the third row in the column 903, since it is the second mapping for the group g=0 and the subframe $1_1^{PSDCH}$ is selected for the representative resource value $n_{PSDCH}=0$ of the group g=0 (see FIG. 8), the absolute time shift amount from the subframe ($1_0^{PSDCH}$) that has been already selected in the first mapping is 1. Next, regarding the fourth row in the column 903, since it is the second mapping for the group g=1 and the subframe $1_2^{PSDCH}$ is selected for the representative resource value $n_{PSDCH}=15$ of the group g=1 (see FIG. 8), the absolute time shift amount from the subframe ($1_0^{PSDCH}$) that has been already selected in the first mapping is 2.

The column 904 shows an intra-resource group time shift amount in the resource group g=0. Therefore, the column 904 is used only for the resource group g=0. For example, regarding the third row in the column 904, since it is the second mapping for the group g=0 and the subframe $1_1^{PSDCH}$ is selected for the representative resource value $n_{PSDCH}=0$ of the group g=0 (see FIG. 8), the time shift amount from the subframe $1_0^{PSDCH}$ that has been already selected for the resource group g=0 is one. Further, regarding the fifth row in the column 904, since it is the third mapping for the group g=0 and the subframe $1_4^{PSDCH}$ is selected for the representative resource value $n_{PSDCH}=0$ of the group g=0 (see FIG. 8), the time shift amounts from two subframes $1_0^{PSDCH}$ and $1_1^{PSDCH}$ that have been already selected for the resource group g=0 are 4 and 3.

The column 905 shows an inter-resource group time shift amount between the resource group g=0 and the resource group g=1. Note that the column 905 is used when transmission of the resource group g=0 is time-shifted and newly mapped onto subframes and shows time shift amounts from subframes that have been already selected for the representative resource value $n_{PSDCH}=15$ of the other resource group g=1 to subframes that are newly selected for the representative resource value $n_{PSDCH}=0$ of the resource group g=0. Therefore, the column 905 is used only for the resource group g=0. For example, regarding the third row in the column 905, since it is the second mapping for the group g=0 and the subframe $1_1^{PSDCH}$ is selected for the representative resource value $n_{PSDCH}=0$ of the group g=0 (see FIG. 8), the time shift amount from the subframe $1_0^{PSDCH}$ that has been already selected for the representative resource value $n_{PSDCH}=15$ of the resource group g=1 is 1. Further, regarding the fifth row in the column 905, since it is the third mapping for the group g=0 and the subframe $1_4^{PSDCH}$ is selected for the representative resource value $n_{PSDCH}=0$ of the group g=0 (see FIG. 8), the time shift amounts from the subframes $1_0^{PSDCH}$ and $1_2^{PSDCH}$ that have been already selected for the representative resource value $n_{PSDCH}=15$ of the resource group g=1 are 4 and 2.

The column 906 shows an intra-resource group time shift amount in the resource group g=1. Therefore, the column 906 is used only for the resource group g=1. For example, regarding the fourth row in the column 906, since it is the second mapping for the group g=1 and the subframe $1_2^{PSDCH}$ is selected for the representative resource value $n_{PSDCH}=15$ of the group g=1 (see FIG. 8), the time shift amount from the subframe $1_0^{PSDCH}$ that has been already selected for the resource group g=1 is two. Further, regarding the sixth row in the column 906, since it is the third mapping for the group g=1 and the subframe $1_7^{PSDCH}$ is selected for the representative resource value $n_{PSDCH}=15$ of the group g=1 (see FIG. 8), the time shift amounts from two subframes $1_0^{PSDCH}$ and $1_2^{PSDCH}$ that have been already selected for the resource group g=1 is 7 and 5.

The column 907 shows an inter-resource group time shift amounts between the resource group g=1 and the resource group g=0. Note that the column 907 is used when transmission of the resource group g=1 is time-shifted and newly mapped onto subframes and shows time shift amounts from subframes that have been already selected for the representative resource value $n_{PSDCH}=0$ of the other resource group g=0 to subframes that are newly selected for the representative resource value $n_{PSDCH}=1$ of the resource group g=1. Therefore, the column 907 is used only for the resource group g=1. For example, regarding the fourth row in the column 907, since it is the second mapping for the group g=1 and the subframe $1_2^{PSDCH}$ is selected for the representative resource value $n_{PSDCH}=15$ of the group g=1 (see FIG. 8), the time shift amounts from the subframes $1_0^{PSDCH}$ and $1_1^{PSDCH}$ that have been already selected for the representative resource value $n_{PSDCH}=0$ of the resource group g=0 are 2 and 1. Further, regarding the sixth row in the column 907, since it is the third mapping for the group g=1 and the subframe $l_7^{PSDCH}$ is selected for the representative resource value $n_{PSDCH}$=15 of the group g=1 (see FIG. 8), the time shift amounts from the subframes $l_0^{PSDCH}$, $l_1^{PSDCH}$ and $l_4^{PSDCH}$ that have been already selected for the representative resource value $n_{PSDCH}$=0 of the resource group g=0 are 7, 6 and 3.

Note that the time shift amounts in the columns 905 and 907 are in a mutually-cyclic relation. For example, when the inter-resource group time shift amount between the resource group g=0 and the other resource group g=1 is one in the column 905, it corresponds to the inter-resource group time shift amount of 14 (=15−1) between the resource group g=1 and the other resource group g=0 in the column 907. That is, when the time shift amount in the column 905 is s, it corresponds to the time shift amount ($L_{PSDCH}$-s) in the column 907. On the other hand, when the time shift amount in the column 907 is s, it corresponds to the time shift amount ($L_{PSDCH}$-s) in the column 905. Therefore, when the time shift amount is adjusted, it is necessary to take account of the relation between the time shift amounts in the columns 905 and 907.

In the table shown in FIG. 9, it should be noted that the absolute time shift amount in the third mapping for the group g=1 is adjusted to 7 (see the symbol 908 in FIG. 9), instead of being adjusted to 6, so that the same time shift amount of 2 (the symbol 909 in FIG. 9) that is already used in the fourth row in the column 907 does not appear in the time shift amounts in the sixth row in the column 907. If the absolute time shift amount in the third mapping for the group g=1 is 6, the mapping shown in FIG. 7 is obtained and, accordingly, the same time shift amount of 2 that is already used in the fourth row in the column 907 appears in the time shift amounts in the sixth row in the column 907. In contrast to this, in the mapping shown in FIGS. 8 and 9, since the absolute time shift amount in the third mapping for the group g=1 is adjusted to 7, the time shift amounts in the sixth row in the column 907 are 7, 6, and 3 as described above (see the symbol 910 in FIG. 9). As described above, by avoiding coincidences of the inter-resource group time shift amounts as much as possible, it is possible to avoid a situation in which twice or more times of PSDCH transmission are performed in the same set of subframes for a combination of any two resource values $n_{PSDCH}$ as much as possible.

Figure 10:
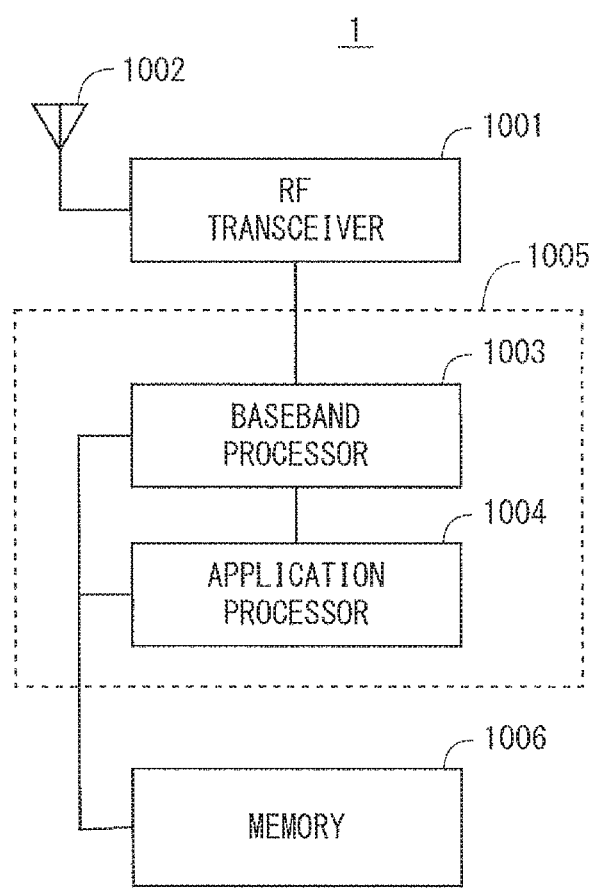
FIG. 10 is a block diagram showing an example of a radio terminal according to some embodiments.

Lastly, configuration examples of the UE 1 according to the above-described plurality of embodiments will be described. FIG. 10 is a block diagram showing a configuration example of the UE 1. A Radio Frequency (RF) transceiver 1001 performs an analog RF signal processing to communicate with the eNB 2. The analog RF signal processing performed by the RF transceiver 1001 includes a frequency up-conversion, a frequency down-conversion, and amplification. The RF transceiver 1001 is coupled to an antenna 1002 and a baseband processor 1003. That is, the RF transceiver 1001 receives modulated symbol data (or OFDM symbol data) from the baseband processor 1003, generates a transmission RF signal, and supplies the generated transmission RF signal to the antenna 1002. Further, the RF transceiver 1001 generates a baseband reception signal based on a reception RF signal received by the antenna 1002 and supplies the generated baseband reception signal to the baseband processor 1003.

The baseband processor 1003 performs digital baseband signal processing (i.e., data-plane processing) and control-plane processing for radio communication. The digital baseband signal processing includes (a) data compression/de-compression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE or LTE-Advanced, the digital baseband signal processing performed by the baseband processor 1003 may include signal processing of Packet Data Convergence Protocol (PDCP) layer, Radio Link Control (RLC) layer, MAC layer, and PHY layer. Further, the control-plane processing performed by the baseband processor 1003 may include processing of Non-Access Stratum (NAS) protocol, RRC protocol, and MAC CE.

The baseband processor 1003 may include a modem processor (e.g., Digital Signal Processor (DSP)) that performs the digital baseband signal processing and a protocol stack processor (e.g., Central Processing Unit (CPU) or a Micro Processing Unit (MPU)) that performs the control-plane processing. In this case, the protocol stack processor, which performs the control-plane processing, may be integrated with an application processor 1004 described in the following.

The application processor 1004 may also be referred to as a CPU, an MPU, a microprocessor, or a processor core. The application processor 1004 may include a plurality of processors (processor cores). The application processor 1004 loads a system software program (Operating System (OS)) and various application programs (e.g., voice call application, WEB browser, mailer, camera operation application, and music player application) from a memory 1006 or from another memory (not shown) and executes these programs, thereby providing various functions of the UE 1.

In some implementations, as represented by a dashed line (1005) in FIG. 10, the baseband processor 1003 and the application processor 1004 may be integrated on a single chip. In other words, the baseband processor 1003 and the application processor 1004 may be implemented in a single System on Chip (SoC) device 1005. A SoC device may be referred to as a system Large Scale Integration (LSI) or a chipset.

The memory 1006 is a volatile memory, a nonvolatile memory, or a combination thereof. The memory 1006 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1006 may include, for example, an external memory device that can be accessed by the baseband processor 1003, the application processor 1004, and the SoC 1005. The memory 1006 may include an internal memory device that is integrated in the baseband processor 1003, the application processor 1004, or the SoC 1005. Further, the memory 1006 may include a memory in a Universal Integrated Circuit Card (UICC).

The memory 1006 may store software module (a computer program) including instructions and data to perform processing by the UE 1 described in the aforementioned plurality of embodiments. In some implementations, the baseband processor 1003 or the application processor 1004 may be configured to load the software module from the memory 1006 and execute the loaded software module, thereby performing the processing of the UE 1 described by using the sequence diagrams and the flowcharts in the aforementioned embodiments.

As described above with reference to FIG. 10, each of the processors included in the UE 1 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

Each of the above embodiments may be used individually, or two or more of the embodiments may be appropriately combined with one another.

The above-described embodiments have been described mainly for the sidelink discovery Type 1 (i.e., the autonomous resource selection). However, these embodiments may be applied to the sidelink discovery Type 2B (i.e., the scheduled resource selection). As already described, in the sidelink discovery Type 2B, the eNB 2 allocates radio resources for transmission of a discovery signal (PSDCH) to the UE 1 in a semi-persistent manner. Specifically, the UE 1 may select subframes for the first transmission in each discovery period according to one or more parameter values set by the eNB 2. Then, subframes for second and subsequent transmissions in each discovery period may be determined according to the above-described embodiment.

Further, the above-described embodiments may also be applied to the sidelink discovery Type 2A, though it is not specified in 3GPP Release 12. As already described, in the sidelink discovery Type 2A, the eNB 2 dynamically allocates radio resources for transmission of a discovery signal (PSDCH) to the UE 1 in each discovery period (PSDCH period). Specifically, the UE 1 may select subframes for the first transmission in each discovery period according to one or more parameter values set by the eNB 2. Then, subframes for second and subsequent transmissions in each discovery period may be determined according to the above-described embodiment.

The above-described embodiments are not limited to the LTE-Advanced and its improvements and may be applied to D2D communication in other mobile communication networks or systems.

Further, the above-described embodiments are merely examples of applications of the technical ideas obtained by the inventor. These technical ideas are not limited to the above-described embodiments and various modifications can be made thereto.

This application is based upon and claims the benefit of priority from Japanese patent application No. 2015-130459, filed on Jun. 29, 2015, the disclosure of which is incorporated herein in its entirety by reference.

REFERENCE SIGNS LIST

1 UE
2 eNB
1001 RADIO FREQUENCY (RF) TRANSCEIVER
1003 BASEBAND PROCESSOR
1004 APPLICATION PROCESSOR
1006 MEMORY

The invention claimed is:

1. A method for radio communication performed in a radio terminal, the method comprising:

selecting, from a resource pool including L subframes and M frequency domain resource blocks in a discovery period, a set of $N^{TX}$ subframes for $N^{TX}$ times of transmission of a discovery signal in the discovery period based on a first value n1, the first value n1 being a resource value autonomously selected by the radio terminal or a value of a parameter received from a base station, wherein the set of $N^{TX}$ subframes selected based on the first value n1 are selected so as to share at least one common subframe with another set of $N^{TX}$ subframes selected based on a second value of the resource value or the parameter, different from the first value n1, and so as to include at least one subframe different from any of the another set of $N^{TX}$ subframes selected based on the second value, wherein the selecting the set of $N^{TX}$ subframes comprises:

determining a first resource group index g corresponding to the first value n1 according to the following expression using the first value n1 and the number L of the subframes in the resource pool $g = \lfloor n1/L \rfloor$, and selecting the set of $N^{TX}$ subframes based on a total number $N_{GROUP}$ of a plurality of resource group indexes, which includes a first resource group index, and based also on the first resource group index g, and a time shift amount from a subframe used for (j−1)th transmission of the discovery signal to a subframe used for j-th transmission of the discovery signal in the discovery period changes depending on whether the resource value or the parameter has the first value or the second value, where j is an integer equal to or greater than 2.

2. The method according to claim 1, wherein the j-th transmission of the discovery signal in the discovery period occurs in a subframe among the $l_{b_j}$ subframes $l_0, l_1, \ldots, l_{L-1}$ in the resource pool, where $b_1 = n \bmod L$ for $j=1$, $$b_j = \left[b_1 + \frac{j-1}{2}\{2(g+1) + (j-2)N_{GROUP}\}\right] \bmod L \text{ for }$$
$1 < j \le N^{TX}$ where n is the first value n1.

3. The method according to claim 1, further comprising selecting $N^{TX}$ sets of frequency domain resource blocks used for the $N^{TX}$ times of transmission of the discovery signal based on the first value n1, wherein
each resource block in the $N^{TX}$ sets of frequency domain resource blocks selected based on the first value n1 is selected so that it differs from any of resource blocks in $N^{TX}$ sets of frequency domain resource blocks selected based on the second value.

4. A radio terminal comprising:
at least one radio transceiver; and
at least one processor configured to perform cellular communication with a cellular network and device-to-device communication with another radio terminal by using the at least one radio transceiver, wherein
the at least one processor is further configured to select, from a resource pool including L subframes and M frequency domain resource blocks in a discovery period, a set of $N^{TX}$ subframes for $N^{TX}$ times of transmission of a discovery signal in the discovery period based on a first value n1, the first value n1 being a resource value autonomously selected by the radio terminal or a value of a parameter received from a base station,
the set of $N^{TX}$ subframes selected based on the first value n1 are selected so as to share at least one common subframe with another set of $N^{TX}$ subframes selected based on a second value of the resource value or the parameter, different from the first value n1, and so as to include at least one subframe different from any of the another set of $N^{TX}$ subframes selected based on the second value, wherein the at least one processor is further configured to:
determine a first resource group index g corresponding to the first value n1 according to the following expression using the first value n1 and the number L of the subframes in the resource pool $g = \lfloor n1/L \rfloor$, and select the set of $N^{TX}$ subframes based on a total number $N_{GROUP}$ of a plurality of resource group indexes, which includes a first resource group index, and based also on the first resource group index g, and
a time shift amount from a subframe used for (j−1)th transmission of the discovery signal to a subframe used for j-th transmission of the discovery signal in the discovery period changes depending on whether the resource value or the parameter has the first value or the second value, where j is an integer equal to or greater than 2.

5. The radio terminal according to claim 4, wherein the j-th transmission of the discovery signal in the discovery period occurs in a subframe $l_{b_j}$ among the L subframes $l_0, l_1, \ldots, l_{L-1}$ in the resource pool, where $b_1 = n \bmod L$ for $j=1$, $b_j = \left[ b_1 + \frac{j-1}{2} \{2(g+1) + (j-2)N_{GROUP}\} \right] \bmod L$ for $1 < j \leq N^{TX}$ where n is the first value n1.

6. The radio terminal according to claim 4, wherein
the at least one processor is further configured to select $N^{TX}$ sets of frequency domain resource blocks used for the $N^{TX}$ times of transmission of the discovery signal based on the first value n1, and
each resource block in the $N^{TX}$ sets of frequency domain resource blocks selected based on the first value n1 is selected so that it differs from any of resource blocks in $N^{TX}$ sets of frequency domain resource blocks selected based on the second value.

7. A non-transitory computer readable medium storing a program for causing a computer to perform a radio communication method in a radio terminal, wherein
the method comprises selecting, from a resource pool including L subframes and M frequency domain resource blocks in a discovery period, a set of $N^{TX}$ subframes for $N^{TX}$ times of transmission of a discovery signal in the discovery period based on a first value n1, the first value n1 being a resource value autonomously selected by the radio terminal or a value of a parameter received from a base station,
the set of $N^{TX}$ subframes selected based on the first value n1 are selected so as to share at least one common subframe with another set of $N^{TX}$ subframes selected based on a second value of the resource value or the parameter, different from the first value n1, and so as to include at least one subframe different from any of the another set of $N^{TX}$ subframes selected based on the second value, wherein the selecting the set of $N^{TX}$ subframes comprises:
determining a first resource group index g corresponding to the first value n1 according to the following expression using the first value n1 and the number L of the subframes in the resource pool $g = \lfloor n1/L \rfloor$, and selecting the set of $N^{TX}$ subframes based on a total number $N_{GROUP}$ of a plurality of resource group indexes, which includes a first resource group index, and based also on the first resource group index g, and
a time shift amount from a subframe used for (j−1)th transmission of the discovery signal to a subframe used for j-th transmission of the discovery signal in the discovery period changes depending on whether the resource value or the parameter has the first value or the second value, where j is an integer equal to or greater than 2.

8. The non-transitory computer readable medium according to claim 7, wherein the j-th transmission of the discovery signal in the discovery period occurs in a subframe $l_{b_j}$ among the L subframes $l_0, l_1, \ldots, l_{L-1}$ in the resource pool, where $b_1 = n \bmod L$ for $j=1$, $b_j = \left[ b_1 + \frac{j-1}{2} \{2(g+1) + (j-2)N_{GROUP}\} \right] \bmod L$ for $1 < j \leq N^{TX}$ where n is the first value n1.

9. The non-transitory computer readable medium according to claim 7, wherein
the method further comprising selecting $N^{TX}$ sets of frequency domain resource blocks used for the $N^{TX}$ times of transmission of the discovery signal based on the first value n1, and
each resource block in the $N^{TX}$ sets of frequency domain resource blocks selected based on the first value n1 is selected so that it differs from any of resource blocks in $N^{TX}$ sets of frequency domain resource blocks selected based on the second value.

\* \* \* \* \*